May 9, 1950        E. EKLUND        2,507,371

SAW SHARPENER

Filed Nov. 4, 1946        4 Sheets-Sheet 1

Inventor
EINAR EKLUND

By Carlsen & Hagle
Attorney

May 9, 1950 E. EKLUND 2,507,371
SAW SHARPENER
Filed Nov. 4, 1946 4 Sheets-Sheet 2
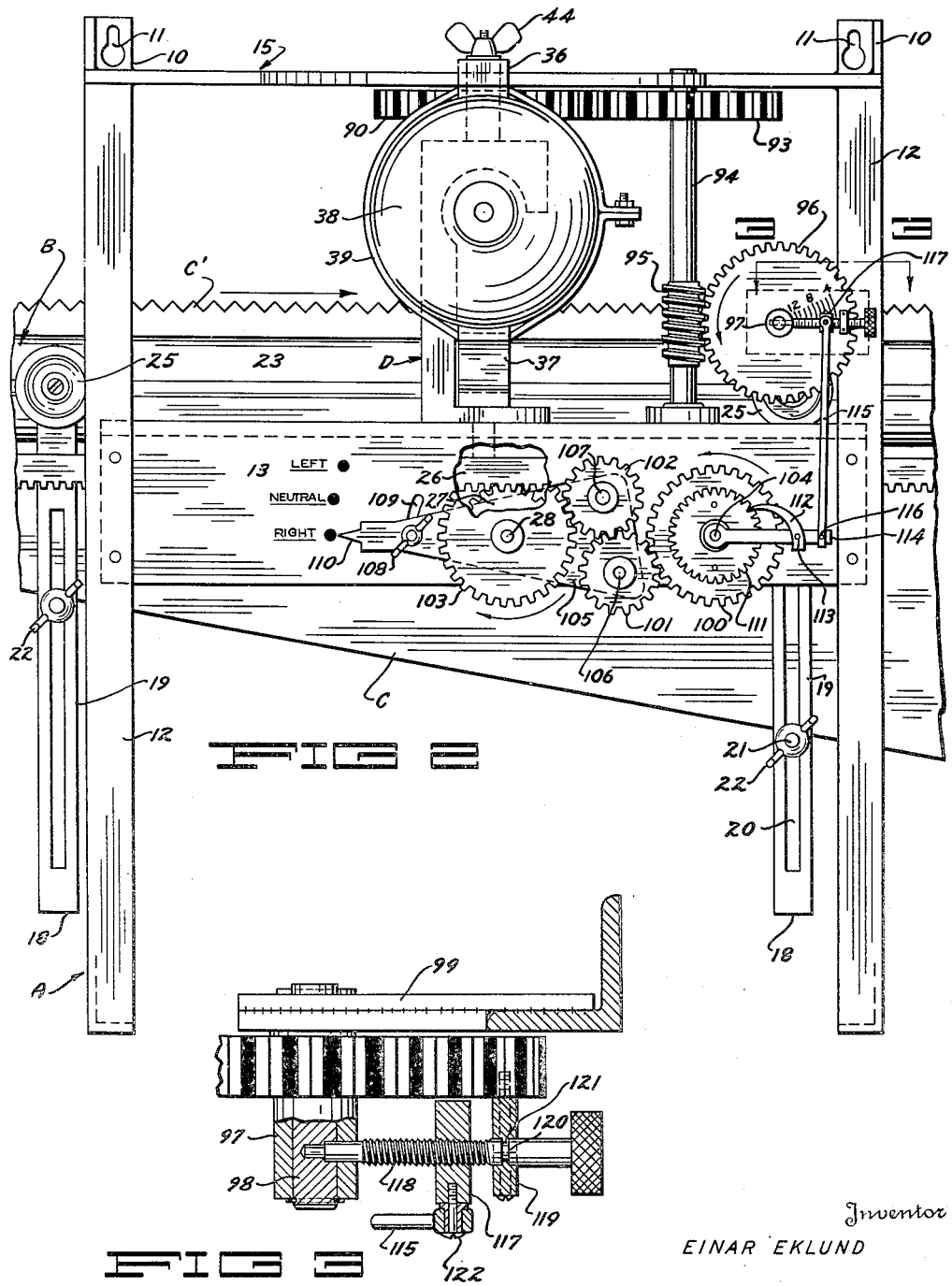
Inventor
EINAR EKLUND
By Carlsen & Hagle
Attorney

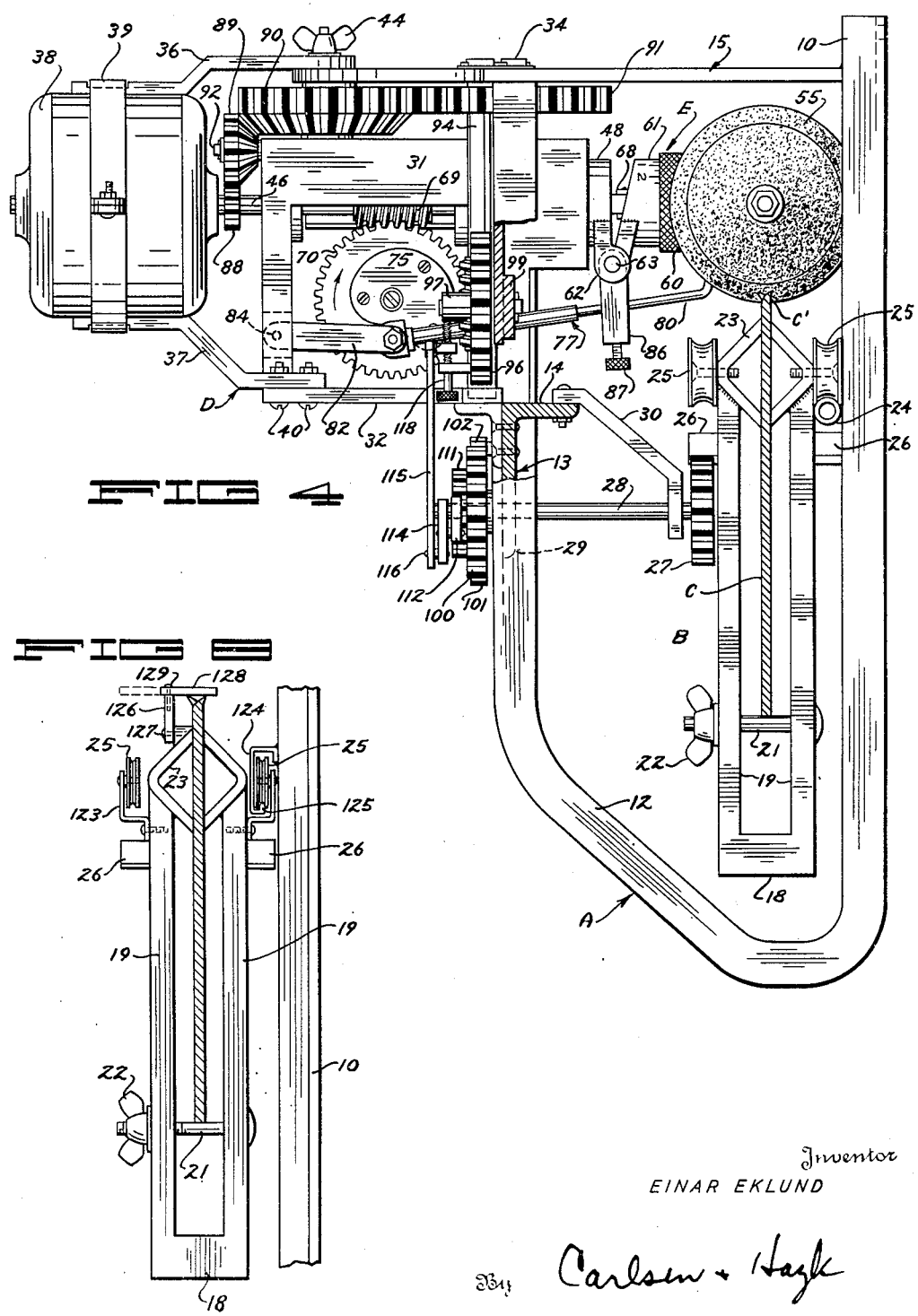

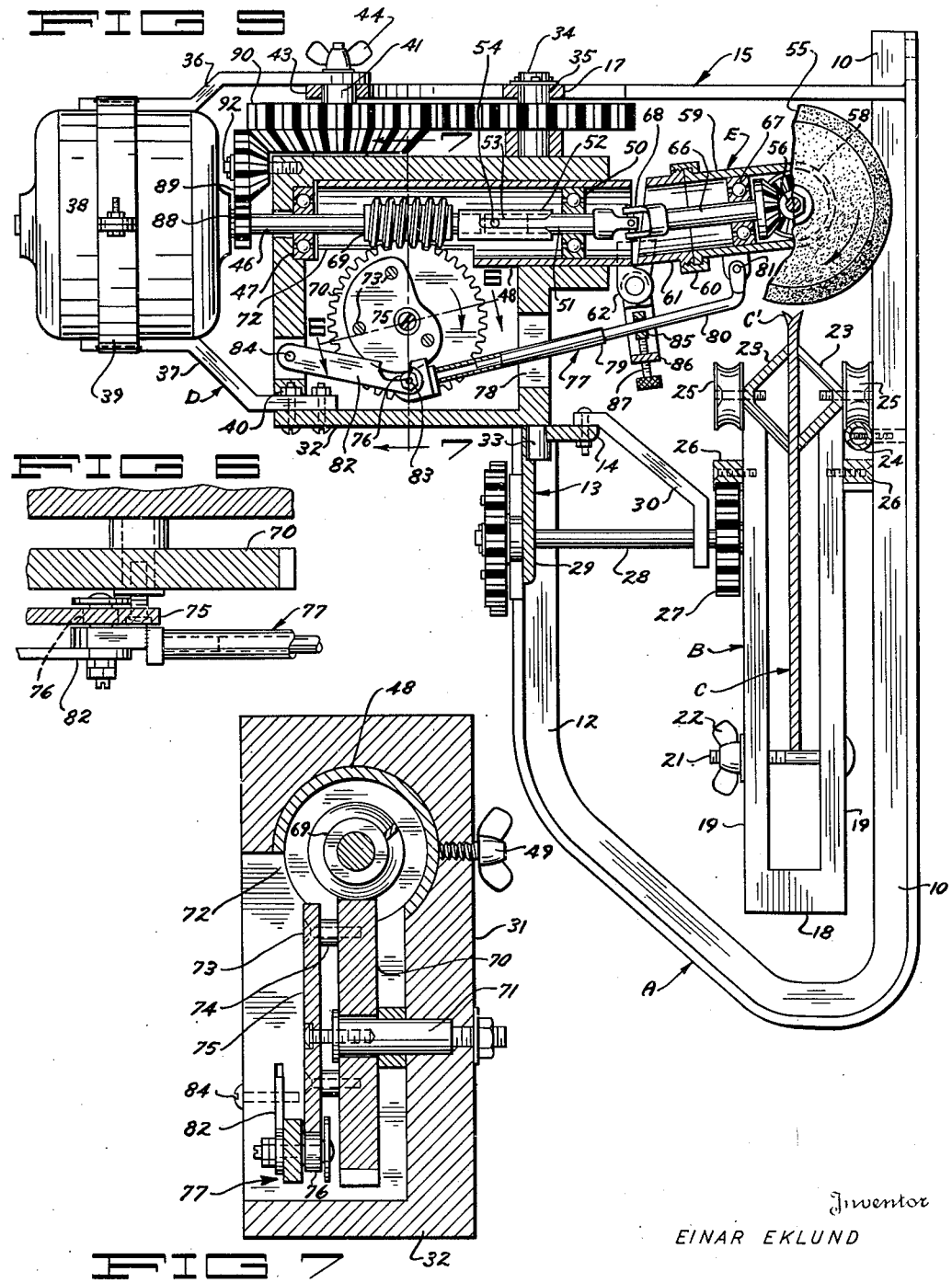

Patented May 9, 1950

2,507,371

UNITED STATES PATENT OFFICE 2,507,371

SAW SHARPENER

Einar Eklund, Glendale, Calif.

Application November 4, 1946, Serial No. 707,595

9 Claims. (Cl. 76—40)

This invention relates to improvements in machines for sharpening saws and the primary object is to provide a machine for this purpose which, once it is set up for the particular saw to be sharpened, will thereafter function automatically to evenly and accurately sharpen the saw teeth.

Another object is to provide a saw sharpening machine which is readily and fully adjustable to operate on all common saws and which is comparatively simple, practical and durable in construction.

These and other more detailed and specific objects will be disclosed in the course of the following specification, reference being had to the accompanying drawings, in which—

Fig. 2 is a front view, partially broken away.

Fig. 3 is an enlarged fragmentary detail view in section and plan, taken in the direction of the arrows and line 3—3 in Fig. 2.

Fig. 4 is an end view of the machine, the saw being shown in vertical section.

Fig. 5 is a view similar to Fig. 4 but showing many parts in section to disclose interior details.

Fig. 6 is an enlarged, fragmentary sectional view along the line 6—6 in Fig. 5.

Fig. 7 is an enlarged detail sectional view along the line 7—7 in Fig. 5.

Fig. 8 is a detail end view of the saw carriage and support, showing a modification thereof, and showing also a height gauge for the saw.

Figure 1:
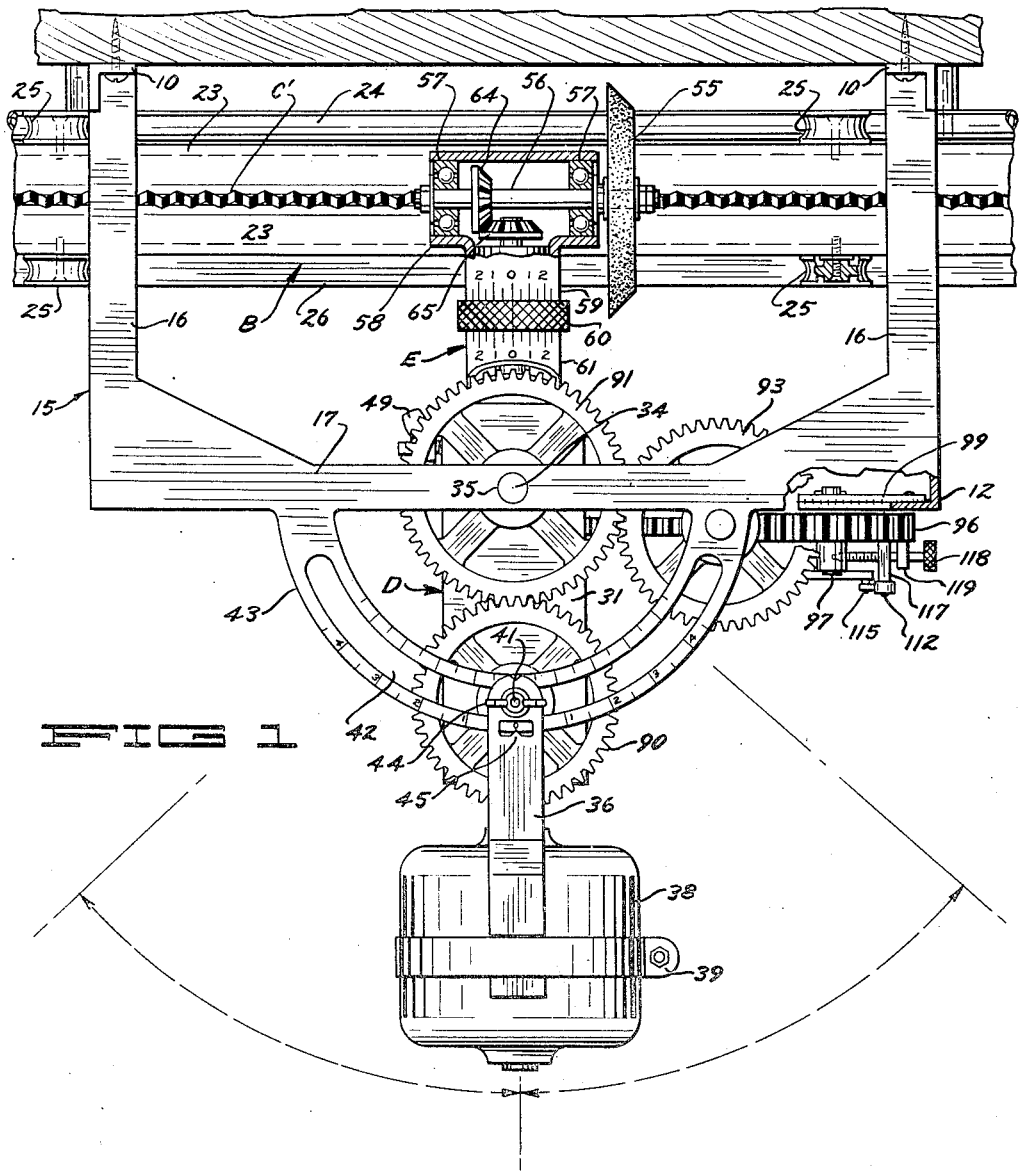
Fig. 1 is a plan view of the machine, with a saw in place for sharpening.

Referring now more particularly and by reference characters to the drawing, A designates generally the main or support frame of my saw sharpening machine which comprises a pair of spaced vertical hanger bars 10 provided at their upper ends as seen in Fig. 2 with key hole slots 11 by means of which the entire machine may be hung on a wall or other support. At their lower ends the bars 10 extend forwardly and upwardly as indicated at 12 in spaced relation to the rear portions of the frame and these upper forward ends of the bars are rigidly joined by a transversely extending angle 13. This angle 13 has a horizontally disposed web 14 located at a level substantially below the upper ends of the bars and, forming a part of the frame assembly, and extending forwardly over and above the angle 13, is an upper frame part 15. This frame part 15 is welded or otherwise secured rigidly at its rear ends to the upper portions of the bars 10 and 12 and as seen in Fig. 1 comprises side arms 16 joined by an integral cross-member 17 disposed directly over the horizontal web 14 of the angle 13.

The machine further comprises a saw clamp and carriage assembly designated generally at B which is arranged to support and carry the saw which is to be sharpened. In the drawing a conventional hand saw is indicated generally at C and is shown as supported in the carriage B in position for sharpening. The saw carriage comprises a pair of U-shaped saw clamps 18, each of which has a pair of upwardly extending arms 19 spaced apart to loosely receive the saw therebetween and these arms 19 are vertically slotted as indicated at 20 to receive clamp bolts 21 provided with wing nuts 22 by which the arms may be drawn together to clamp the saw. The upper ends of the saw clamp arms 19 are rigidly welded or otherwise secured to V-shaped clamp jaws 23 which extend the full length of the saw carriage and are adapted, as seen in Figs. 4–5 to grip a substantial length of the saw C adjacent its toothed edge C' and to support the saw with this edge turned upwardly and in a horizontal plane. The clamp bolts 21 in addition to springing the clamp arms 19 together in order to clamp the saw, are also adjustable vertically in the slots 20 and are adapted to engage the lower edge of the saw C and upwardly support the saw against the downthrust of the cutter during the sharpening operation.

The saw carriage B is supported for traverse movement crosswise in the frame A by means primarily of a track 24 which is secured in a horizontal position across the frame bars 10. Adjacent the upper end of each clamp 18 the saw carriage is provided with rollers 25 on both front and rear sides and when the carriage is introduced into the frame the rear rollers will operate along the track 24 to enable the saw carriage to move transversely in the frame as will be readily understood. My purpose in providing the rollers 25 at both front and rear sides of the carriage is to enable the carriage and its clamp so to be turned end for end merely by removing the carriage from the machine and turning it about and re-inserting it thereinto. The saw carriage is further supported and is mechanically traversed by means of gear racks 26 which are secured to the clamp arms 19 and extend lengthwise of the carriage below the rollers 25. The lower toothed edge of the forward rack 26 rests upon and meshes with a traversing gear 27 which is supported by a shaft 28 extending rearwardly into the machine through a bearing in the vertical web 29 of the aforesaid transverse angle 13. The rear end of the shaft 28 is also journaled in a bracket 30 extending rearwardly and inwardly from the horizontal web 14 of this angle. It will thus be seen that the traverse gear 27 supports the forward side of the carriage B and that by rotation of the shaft 28 the entire saw carriage will be traversed to move the saw C endwise and through the frame A. Here again the purpose of providing the two racks 26 is to enable the saw carriage to be reversed end for end as above described.

Positioned in the upper forward side of the main support frame A is an adjustable cutter frame designated generally at D which comprises a substantially rectangular gear housing 31 the bottom 32 of which has a depending pin 33 pivotally seated in a recess provided for its accommodation in the center of the web 14 of the angle 13. In vertical alignment with the pin 33 the housing 31 further has a pin 34 which extends upwardly through an opening 35 provided at the center of the cross bar 17 of the upper frame part 15. The arrangement is thus such that the housing 31 and all connected parts of the cutter frame D may be swung in a horizontal plane about the vertical axis of the pins 33—34 for a purpose later to be described. Also forming a part of the cutter frame D are upper and lower motor brackets 36—37 between the extended ends of which a conventional electric motor 38 is secured by a clamp band 39. The lower motor bracket is secured as designated at 40 to the bottom 32 of the gear housing 31 while the upper bracket 36 is seated over a pin 41 extending upwardly and rigidly from the top of the said housing. The pin 41 plays in an arcuate slot 42 formed in a corresponding shaped forward extension 43 of the frame 15 and the upper extremity of the pin is reduced and threaded to receive a wing nut 44 by which the upper motor bracket may be forced down into clamping engagement with the frame part 43. The slot 42 is centered about the opening 35 for the upper pivot pin 34 and the arrangement is thus obviously such that the entire cutter frame may be swung about the axis of the pins 33—34 through the arcs indicated in Fig. 1 and held at any angularly adjusted position by tightening the wing nut 44. The margins of the slot 42 are graduated to cooperate with an index 45 on the upper motor bracket 36 to indicate the angle to which the cutter frame is adjusted. The power shaft 46 of the motor 38 extends into the upper part of the gear housing 31 through a bearing 47 shown in Fig. 5 and terminates at a point within the said housing. Slidably positioned in the upper part of the housing, co-axially with the motor shaft 46, is a cutter support sleeve 48 into which the motor shaft extends and this sleeve 48 may be adjusted endwise in a forward and rearward direction with respect to the housing and fastened at any such adjusted position by a set screw 49 shown in Fig. 7. This adjustment of the sleeve 48 permits its rear end to be extended from the housing to any extent necessary in order to bring the cutter into proper registry with the saw as will be presently described. A bearing 50 is secured in the rear portion of the sleeve 48 and rotatably supports a shaft section 51 which extends slidably into a tubular coupling 52 secured at the rear end of the motor shaft 46. This coupling 52 is slotted lengthwise at 53 to fit a pin 54 extending crosswise through the forward portion of the shaft section 51 and the coupling thus establishes a rotary drive connection between the motor shaft 46 and the shaft section 51 while permitting relative endwise adjustments of the two shafts as necessary during the aforesaid adjustment of the sleeve 48.

A cutter or sharpening head designated generally at E is supported upon the rear end of the sleeve 48 and projects rearwardly over the saw C in the saw carriage B. The operating element of the head E consists of an abrasive wheel 55 having a beveled edge as clearly shown and this wheel is carried at one end of a shaft 56 journaled in bearings 57 in a tubular rear part 58 of the cutter head. Extending forwardly from this tubular rear part of the cutter head is a tubular member 59 which is joined by a union 60 to a similar tubular part 61 positioned immediately rearwardly of the sleeve 48. The sleeve 48 and this tubular part 61 of the cutter head have mating hinge lugs on their lower adjacent edges indicated generally at 62 which are pivotally connected by a hinge pin 63 in such a manner as to allow the cutter head to be swung upwardly and downwardly in a vertical pane with respect to the sleeve 48 and the aforesaid cutter frame D. The shaft 56 has a beveled pinion 64 which meshes with a similar pinion 65 secured upon the rear end of a shaft 66 journaled in the tubular parts of the 59—61 of the cutter head in a bearing 67. The forward end of the shaft 66 is connected by a universal joint 68 to the rear end of the shaft section 51 in the cutter frame D to thus establish a driving connection between the motor 38 and the cuter or wheel 55. The universal joint 68 in connection with the coupling 52 permits the aforesaid up and down adjustments of the cuter head E while maintaining this drive connection to the motor.

The up and down adjustments or movements of the cutter head E obviously have the effect of feeding the cutter or wheel 55 toward and away from the toothed edge C' of the saw and these feed movements and the intervening upward return movements of the cutter are accomplished automatically and mechanically as will now be described. Within the gear housing 31 the motor shaft 46 is provided with a worm gear 69 which meshes with a gear 70 journaled upon a shaft 71 secured horizontally to the side of the housing as best seen in Fig. 7. To clear the gear 70 the sleeve 48 is cut out on its side and bottom for some distance lengthwise, as indicated at 72. The gear 70 will thus be rotated by the motor shaft 46 but at a considerably reduced speed. Secured to the face of the gear 70 by screws 73 and spacers 74 is a cam 75 which rotates with the gear and has an irregularly formed peripheral cam surface. Engaging this cam surface is a roller 76 journaled at the forward end of an arm, indicated generally at 77, which extends rearwardly loosely through an opening 78 in the gear housing to a point beneath the cutter head E. The arm 77 has a tubular forward sleeve 79 into which is slidably telescoped a rod 80 which forms a rear part of the arm and is upwardly turned and is pivotally attached at 81 to the underside of the cutter head. This telescopic relation of the two sections of the arm 77 allows it to adjust itself to the aforesaid forward and rearward extension of the cutter head E and sleeve 48, without moving the roller 76 out of contact with the cam 75, and the roller is so held by means of a link 82 which is pivotally connected at 83 through the forward end of the arm 77 and is also pivotally attached at 84 from the said end of the gear housing. Obviously this link 82 will hold the forward end of the arm 77 while the rod 80 slides into or out of the same when making the cutter adjustments. An adjustable fulcrum is provided for the arm 77 and comprises an apertured eye 85 which loosely engages the rod 80 at a point beneath the hinge connection 62—63 for the cutter head E. A U-shaped yoke 86 depends from one of the hinge lugs 62 and the eye 85 is held in this yoke by means of an adjustment screw 87 threaded up through the lower end of the yoke. Obviously by adjusting the screw 87 the fulcrum point provided by the engagement of the eye 85 with the rod 80 may be adjusted upwardly and downwardly with respect to the hinge axis for the cutter head. It will further be readily understood that the rotation of the gears 70 will cause the cam 75 to alternately move the roller 76 upwardly and downwardly to thus rock the arm 77 about the aforesaid fulcrum point. The downward movement of the roller 76 will, of course, move the cutter head E upwardly, and vice versa, and by properly shaping the cam surface the cutter head E may be caused to feed downwardly toward the saw and return upwardly therefrom once during each complete revolution of the gear 70 and the attached cam 75. The adjustment of the fulcrum point provided by the eye 85 will determine the upper and lower limits of this movement of the cutter head E and thus enable the operator to determine the depth to which the teeth of the saw will be ground by the wheel 55.

The traversing mechanism for the saw carriage B comprises a gear train which is in part carried by the cutter frame D and comprises gears 88, 89, 90 and 91. The gear 88 is mounted upon the motor shaft 46 and meshes with the gear 89, which is supported by a stub shaft 92 secured to the adjacent side of the housing 31, while the gears 90 and 91 are respectively journaled upon the pins 41—34. The gears 89—90 are composite and include spur gear sections for mating with the respective gears 88—91, as well as beveled sections which mesh together as clearly shown in Figs. 4–5. This gear train further includes a gear 93 which is secured upon an upright shaft 94 journaled at its upper end in the forward portion 17 of the frame 15 and at its lower end in a bearing upon the horizontal web 14 of the angle 13. This gear 93 meshes with the aforesaid gear 91 and as will be clearly apparent in Fig. 1 will maintain this meshed relation with the gear 91 in any adjusted angular position of the cutter frame, since the gear is centered about the axis upon which this frame is adjusted.

A worm 95 is secured upon the shaft 94 and meshes with a worm gear 96 having a hub 97 secured upon a stub shaft 98 which is journaled in a bracket 99 fastened to the adjacent forward portion 12 of the frame A. The gear train just described will obviously cause the rotation of the worm gear 96 by the motor 38 but at a reduced speed.

The traversing mechanism further includes another gear train consisting of gears 100, 101, 102 and 103 which are located on the forward side of the frame angle 13. The gear 100 is journaled upon a shaft 104 extending forwardly from the frame angle while the gear 103 is affixed to the forward end of the aforesaid shaft 28 which carries the traversing gear 27. Oscillatably mounted on this shaft 28 is a carrier plate 105 having studs 106 and 107 whereon the gears 101—102 are rotatably mounted. These gears 101—102 mesh with each other as seen in Fig. 2 and the gear 102 is permanently in mesh with the gear 103 but the arrangement is such that, by oscillating the carrier plate 105, the gears 101—102 may be selectively moved into meshing relation with the gear 100, or both may be moved out of mesh therewith as will be clearly apparent. The carrier plate 105 may be secured in any adjusted position by means of a wing screw 108 which plays in an arcuate slot 109 in the angle 13 and the plate further has an index 110 to indicate the three adjusted positions just described. Also secured upon the shaft 103 to rotate with the gear 100 is a marginally toothed ratchet wheel 111 with which cooperates a pawl 112 pivotally carried at 113 upon a crank arm 114 pivotally attached to the shaft 104 and movable independently of the gear 100. A link 115 is pivotally attached at 116 to the free end of the crank 114 and extends therefrom in an upward direction forward of the worm gear 96. Adjustable eccentric connection is made between this link 115 and the worm gear 96 and comprises a pivot block 117 which is screw threaded upon an adjustment screw 118 extending radially outward from the hub 97 of the gear. As best shown in Fig. 3 the screw 118 is journaled into the aforesaid hub 97 and the outer end portion of the screw is journaled through a bearing 119 secured to the face of the worm gear near its periphery. The screw 118 is permitted to rotate but is held against endwise displacement by a groove 120 with which cooperates a projection 121 formed in the bearing 119. The link 115 is pivoted at 122 to the forward edge of the block 117 and it will be apparent that the block 117 and this pivot point 122 may be moved inwardly or outwardly in a radial direction with respect to the center whereon the worm gear 96 rotates. As shown in Fig. 2 the forward face of the worm gear is provided with a scale with which an index upon the block 117 cooperates to indicate this adjustment of the eccentricity of the pivot 122.

In the operation of the machine as thus far described it will be understood that the saw C may be clamped in the carriage B and inserted into the machine so that its toothed edge C' is located horizontally below the cutter head E. The cutter frame D may then be adjusted to bring the wheel C into a proper angular relation with respect to the length of the saw blade and the center of the wheel 55 may be brought out into alignment with the saw by releasing the set screw 49 and extending the sleeve 48 as may be required for this purpose. The screw 87 is now adjusted so that the feed movement of the wheel downward to the saw will form the tooth to the proper depth. Assuming the machine then to be set in operation it will be apparent that the wheel 55 will be alternately fed to the work and returned upwardly therefrom by the operation of the cam 75 and arm 77 as previously described. During this operation of raising and lowering the cutter and of forming the tooth upon each feed movement of the cutter the gear train previously described will slowly rotate the worm gear 96. Such rotation of this worm gear will be translated to an up and down movement of the crank 114 through the link 115 and upon each up movement of the crank the pawl 112 will move the ratchet wheel 111 and gear 100 through a partial turn in the direction of the arrow in Fig. 2. This movement of the gear 100 will be transmitted through one of the gears 101—102 to the gear 103 and through that gear will be transmitted to the shaft 28 and the traversing gear 27. As a result the saw carriage B will be moved endwise upon the track 24 as will be clearly understood.

The purpose of this movement is of course to move the saw a distance sufficient to bring the next tooth into operative relation with the wheel 55 each time the wheel is raised from a completed or sharpened tooth. It will be evident therefore that this traversing movement must be properly timed with respect to the feed movements of the cutter head E and this will, of course, be accomplished by proper design of the gear train driving the transverse means. It will be further evident that the extent of each traversing movement must be proportioned to the size of the saw teeth, or to the number of teeth per inch thereon. This is the purpose of the adjustable pivot block 117 and of the scale and index which indicates the position thereof. Obviously the traverse movement will depend upon the amount of rotary movement imparted to the ratchet wheel 111 and gear 100 and this will in turn depend upon the amplitude through which the crank 114 is swung. It follows then that, as the pivot block 117 is moved further outward from the axis or center of the worm gear 96, the eccentricity effective upon the link 115 is increased and the crank 114 and pawl 112 will transmit a greater motion through the gear train to the traversing mechanism. The gradations upon the worm gear 96 may thus directly indicate the setting of the traversing mechanism for standard numbers of teeth per inch upon the saws. The direction of the traversing movement will be controlled by the position of the carrier plate 105 and as shown in Fig. 2 with the gear 101 driven by the gear 100 the saw will move to the right as indicated by the direction arrow above its upper edge. On the other hand, if the carrier plate 105 is adjusted to bring the gear 102 directly into mesh with the gear 100 this gear train will include one less gear, resulting in a reversal of the direction of movement of the saw. If at any time the traverse movement need be stopped, such as when making adjustments, the carrier plate 105 may be moved to a central position so that neither gear 101 nor 102 is driven.

The cutter or wheel 55 may be also adjusted to various angles in the vertical plane with respect to the saw and for this purpose the aforesaid union 60 is knurled and may be loosened so that the tubular portion 59 of the cutter head E may be moved about its axis with respect to the portion 61 and re-fastened in any adjusted position. This adjustment of the cutter is used to properly angle the periphery of the wheel 55 with respect to the teeth being sharpened and as seen in Fig. 1 the union 60 may carry an index cooperating with micrometer scales upon the cutter head to indicate the angle of the wheel. It will be apparent from the foregoing that I thus provide all the adjustments necessary to accommodate the machine to the sharpening of saws of all conventional kinds and that once the machine is set up for each particular saw the operation of sharpening the teeth thereof will be carried out automatically and rapidly and the teeth will all be formed to the same size angle and shape.

Referring now to Fig. 8 of the drawing, I show therein a slight modification of the saw carriage and particularly of the track portion upon which this carriage is traversed. In this case the rollers 25 are not pivoted directly upon the saw clamp arms 19 but upon outrigger brackets 123 secured to these arms and supporting the rollers in spaced relation to the saw clamps. Instead of the track 24 previously described I may then employ a track made of sheet material welded or otherwise suitably secured to the frame bars 10 and having an overhanging portion 124 terminating in a rearwardly and upwardly extending rail 125. The arrangement then is thus such that the rollers 25 may run in contact with the aforesaid rail 125 and inside the overhanging portion 124 of the track and the purpose here is to protect these rollers from the abrasive material flying about during the operation of the cutter from the saw.

I here also show a height gauge one or more of which may be used upon the saw carriage in order to gauge the height at which the saw is clamped in the clamps 18 and to insure that the toothed edge of the saw is horizontally positioned in the carriage. This gauge as here shown comprises an arm 126 pivoted at 127 to the adjacent clamp 23 and an upper arm 128 pivoted at 129 atop the end of the arm 126. When the arms 126—128 are adjusted to the positions shown in the drawing the saw may be moved up until its toothed edge contacts the overhanging arm 128 and then clamped by tightening the wing nuts 22. The arm 128 may then be swung aside clear of the saw and the entire height gauge folded down about the pivot 127 out of the way.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a saw sharpening machine of the character described, a saw carriage having means for supporting a saw to be sharpened, means supporting the saw carriage for traversing movements comprising a track, rollers supporting one side of the carriage upon the track, and a traversing rack and gear supporting the opposite sides of the carriage and operative to impart traverse motion thereto.

2. In a saw sharpening machine of the character described, a saw carriage adapted to support a saw to be sharpened, means supporting the saw carriage for traversing movement endwise and comprising a track, rollers carried by the carriage for operation upon the track, a traversing gear supported in spaced relation to the track, a rack extending lengthwise on the carriage and adapted to be supported upon and mesh with the said traversing gear, and the said carriage having rollers and a rack on opposite sides whereby it may be reversed end for end and supported upon the said track and traversing gear.

3. In a saw sharpening machine of the character described, a frame, a saw carriage having means for holding a saw, cooperating track and roller elements on the frame and carriage supporting one side of the latter for endwise traversing movements, cooperating rack and gear elements on the frame and carriage and supporting the other side of the latter, and means for operating the latter elements for imparting step by step traversing movements to the carriage.

4. In a saw sharpening machine of the character described, a frame, a saw carriage having means for holding a saw, cooperating track and roller elements on the frame and carriage supporting one side of the latter for endwise traversing movements, cooperating rack and gear elements on the frame and carriage and supporting the other side of the latter means for operating the latter elements for imparting step by step traversing movements to the carriage, and said track element having a part overhanging and protecting the roller elements.

5. In a saw sharpening machine of the character described, a frame, a saw carriage having means for holding a saw, cooperating track and roller elements on the frame and carriage supporting one side of the latter for endwise traversing movements, cooperating rack and gear elements on the frame and carriage and supporting the other side of the latter and the said track element having a part extending over and then under the rollers for protecting the same from falling materials.

6. In a saw sharpening machine of the character described, a frame, a saw carriage having means for holding a saw, cooperating track and roller elements on the frame and carriage supporting one side of the saw carriage for endwise travel, cooperating rack and gear elements on the frame and carriage supporting the other side of the carriage and operative to traverse the same, and said elements being duplicated on opposite sides of the carriage whereby it may be reversed end for end in the frame.

7. In a saw sharpening machine of the character described, a holder and carriage for supporting a saw to be sharpened, means supporting the carriage for traversing movements, and traversing mechanism including a gear for driving the carriage and a spaced power operated gear, and a pair of gears supported for selective meshing engagement between the two first mentioned gears for operating the carriage driving gear selectively in opposite directions.

8. In a saw sharpening machine of the character described, a holder and carriage for supporting a saw to be sharpened, means supporting the carriage for traversing movements, and traversing mechanism including a gear for driving the carriage and a spaced power operated gear, a movable carrier plate, and a pair of meshing gears carried by the plate and engageable selectively both or singly between the driving and power operated gears for moving the carriage in opposite directions.

9. In a saw sharpening machine, means for holding a saw for sharpening, a cutter head supported for feed movements toward the saw and away, a cam, a fulcrumed arm swingable by the cam and connected to the cutter head to move the same, and means forming a fulcrum point for the arm and adjustable to regulate the feed movements of the cutter head, said means comprising a yoke, an eye adjustable on the yoke, the arm passing through the eye, and a screw for adjusting the eye.

EINAR EKLUND.

REFERENCES CITED

The following references are of record in the file of this patent:

UNITED STATES PATENTS

| Number | Name | Date |
| --- | --- | --- |
| 142,173 | Olney | Aug. 26, 1873 |
| 261,624 | Olney | July 25, 1882 |
| 316,570 | Richardson | Apr. 28, 1885 |
| 324,434 | Totman | Aug. 18, 1885 |
| 599,114 | Taylor et al. | Feb. 15, 1898 |
| 867,723 | Hedstrom | Oct. 8, 1907 |
| 1,157,890 | Miotke | Oct. 26, 1915 |
| 1,468,986 | Wilthil | Sept. 25, 1923 |
| 1,674,853 | Collier | June 26, 1928 |
| 1,794,695 | Juhl | Mar. 3, 1931 |
| 1,870,718 | Drake | Aug. 9, 1932 |
| 1,952,323 | Litomy | Mar. 27, 1934 |
| 1,974,882 | St. Martin | Sept. 25, 1934 |
| 2,108,310 | Griffing | Feb. 15, 1938 |
| 2,171,024 | Coates | Aug. 29, 1939 |
| 2,217,145 | Stihl | Oct. 8, 1940 |
| 2,277,213 | Dalzen | Mar. 24, 1942 |
| 2,333,298 | Daggett | Nov. 2, 1943 |
| 2,343,171 | Collier | Feb. 29, 1944 |